United States Patent Office 3,418,941
Patented Dec. 31, 1968

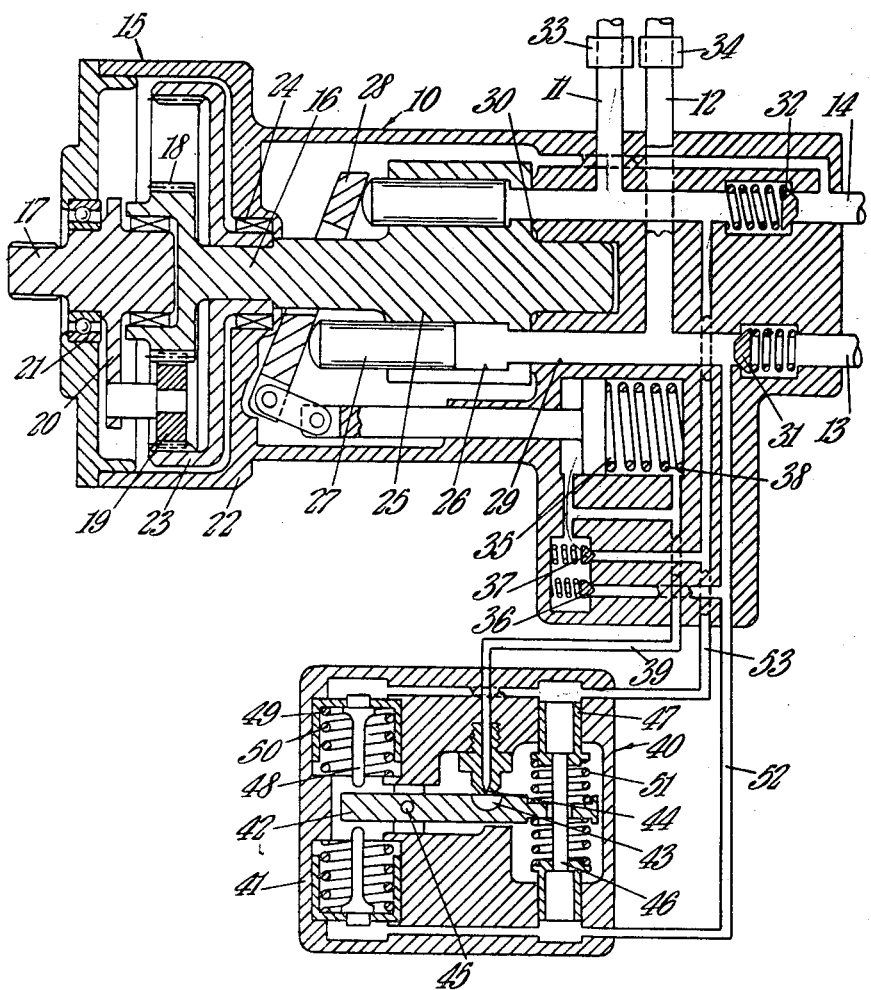

3,418,941
STROKE ADJUSTING MEANS FOR
HYDRAULIC MACHINES
Dorian Farrar Mowbray, Solihull, England, assignor to Joseph Lucas (Industries) Limited, Birmingham, England
Filed Mar. 21, 1966, Ser. No. 535,748
3 Claims. (Cl. 103—162)

ABSTRACT OF THE DISCLOSURE

A means for automatically adjusting the stroke of an hydraulic machine which is capable of operating in the manner a pump or a motor and having a fluid pressure operated servo device for varying the stroke, said means comprising a valve for controlling the escape of fluid to and from the cylinder and pressure responsive means for controlling the position of the valve, the pressure responsive means being arranged at opposite sides of the valve respectively and being responsive to the pressure in the ports in the machine respectively.

---

This invention relates to means for automatically adjusting the stroke of an hydraulic machine which is capable of operating in the manner of a pump or a motor, there being a fluid pressure operated piston and cylinder device for varying the stroke of the machine.

The object of the invention is to provide a means of the kind referred to in a convenient form.

In accordance with the present invention, there is provided means for automatically adjusting the stroke of an hydraulic machine which is capable of operating in the manner of a pump or a motor, and has a fluid pressure operated piston and cylinder device for varying the stroke of the machine, said means comprising valve means for controlling the admission or escape of fluid to and from the cylinder, the valve means being characterised in that it is responsive to the pressure of fluid in whichever of two ports in the machine is at a higher pressure, such that when the machine is operating as a motor, any reduction in pressure in the higher pressure port tends to open the valve to cause the piston and cylinder device to decrease the stroke, and when the machine is acting as a pump any reduction in pressure in the other port which is then at a higher pressure, tends to close the valve to cause an increase in the stroke of the machine.

The invention will now be described by way of example with reference to the accompanying drawing of which the single figure is a diagrammatic cross-sectional view of a machine incorporating this invention.

In the specific example of the invention shown there is provided an hydraulically operated machine indicated generally at 10 which can be supplied with motive fluid through lines 11, 12 from an external source for the purpose of starting an internal combustion engine of the gas turbine kind, for example in an aircraft, and, once the engine is started and the external source removed, can operate as a pump to supply motive fluid through lines 13, 14 to hydraulic apparatus in the aircraft. In this example it is desired that when the machine is operating as a motor, to start the engine, the speed ratio between the machine and the engine should be relatively low, whereas when operating as a pump, the machine should rotate at a speed which is approximately that of the engine itself.

To achieve this, there is provided, between the machine 10 and the engine (not shown), a transmission mechanism 15. The transmission comprises a shaft 16 which is also the shaft of the machine 10, and a shaft 17 which is adapted for connection to the engine, the shaft 16 carrying a sun wheel 18 meshing with a planet pinion 19 supported on a carrier 20 on the shaft 17. Between the adjacent shaft ends is a uni-directional clutch mechanism 21 and a second such mechanism 24 arranged to operate in the opposite sense, is disposed between the shaft 16 and an annular gear 23 which is carried by the body 22 through the intermediary of the second mechanism 24.

When the machine 10 is operating as a motor the annular gear 23 is prevented from rotating by the mechanism 24 so that drive takes place through the sun wheel 18 and planet pinion 19 to the engine shaft 17, the first uni-directional clutch mechanism 21 permitting relative rotation between the shafts 16, 17. When operating as a pump, drive is transmitted through the mechanism 21 to afford direct drive.

The hydraulic machine is of the "swash plate" type and comprises a rotor 25 mounted within the body 22 and connected to or formed integrally with the shaft 16. The rotor 25 has a plurality of equi-angularly spaced bores 26 containing respectively pistons 27, the outer ends of which bear against a cam plate 28, the inclination of which is adjustable. The bores 26 communicate in turn, as the rotor 25 rotates, with a pair of ports 29, 30 in the body 22. The ports 29, 30 communicate through non-return valves 31, 32 with the supply and exhaust lines 13, 14 for connection to hydraulic apparatus to be actuated when the machine 10 is operating in the manner of a pump. The ports 29, 30 also communicate with the supply and exhaust lines 11, 12 from the external source of fluid pressure (not shown) when the machine 10 is operating in the manner of a motor, the lines 11, 12 containing shut-off valves 33, 34 for use when the machine 10 is operating as a pump.

To vary the inclination of the cam plate 28, it is connected to a fluid pressure operable piston and cylinder device 35 in which the piston is spring-biased in the direction of increasing inclination of the cam plate 28, with respect to the axis of rotation of the rotor 25. One end of the cylinder of this device 35 is connected through non-return valves 36, 37 to whichever of the ports 29, 30 is at a higher pressure, this being the inlet port when the machine is operating as a motor and the outlet port when it is operating as a pump.

The opposite end of the cylinder, which contains a compression spring 38 for biasing the piston, is connected to a passage 39 leading to means 40 including a body 41 within which is a bar 42 pivotally mounted at 45 at a position spaced from but near one end. The bar carries a valve closure 43 co-operable with an orifice 44 at the end of the passage 39, the closure 43 being approximately mid-way of the length of the bar 42. The end of the bar 42 remote from the pivot 45 is bored to permit free passage of a rod 46 connecting a pair of spring loaded plungers 47 at opposite sides of the bar 42 respectively. The opposite end of the bar 42 beyond the pivot 45 is capable of being engaged by either of two pins 48 carried respectively by a second larger pair of spring loaded plungers 49 also disposed at opposite sides of the bar 42 respectively. The springs 50 of the plungers 49 are of a higher rating than the springs 51 of the plungers 47 at the opposite end of the bar 42. Two passages 52, 53 in the body 41 respectively connect cylinders in which the plungers 47, 49 on the same side of the bar, are disposed. The two passages 52, 53 are connected respectively to the ports 29, 30 and thus, with this arrangement, the end of the bar 42 remote from the pivot 45 is responsive to fluid pressure through relatively light springs 51 whilst the opposite end is responsive to fluid pressure over a greater area and through heavier springs 50.

In use, when the machine 10 is operating as a motor, the valve closure 43 initially prevents flow through the passage 39 by application of pressure on one plunger 49 at the end of the bar 42 nearer to the pivot 45, through the associated heavy spring 50. This prevents escape of fluids from the cylinder of the device 35 thus maintaining a large inclination of the cam plate 28. Should the pressure fall in the high pressure, or inlet port 30, as speed increases, the valve closure 43 will tend to open under the influence of the lighter spring 51, the heavier spring 50 having moved its plunger 49 away from the bar 42 to disengage the pin 48 from the bar 42. The effect of opening of the closure 43 is to permit the escape of fluid through the passage 39 from the end of the cylinder of the device 35 containing the spring 38. The pressure at the opposite end of the cylinder is now greater so that the piston will move against the spring to reduce the inclination of the cam plate 28 and thus the stroke of the machine 10.

When the machine 10 is operating as a pump, the other port or outlet port 29 will be at the higher pressure so that the plungers 47 and 49 on the opposite side of the bar 42 will be subjected to the higher pressure through the passage 52. Thus increasing pressure in the outlet port 29 of the machine results in opening of the valve closure 43 to open the passage 39 for flow and decreasing stroke of the machine 10 whilst decreasing pressure results in closing of the orifice 44 in the passage 39 and increasing the stroke of the machine.

With this arrangement, therefore, automatic control of the stroke takes place whether the machine is acting as a pump or as a motor, without necessitating reversal of the cam plate 28 or change in direction of rotation of the machine.

Having thus described my invention what I claim as new and desire to secure by Letters Patent is:

1. In a hydraulic machine capable of operating in the manner of either a pump or a motor having means for automatically causing adjustment of the stroke of the hydraulic machine, a piston and cylinder device for effecting the adjustment of the stroke of the machine in the same sense when the machine is being operated as a pump as when it is being operated as a motor, and a pair of ports through which fluid flows in and out of the machine, the improvement residing in said means which comprises: a body; valve means in the body controlling escape of fluid from said piston and cylinder to vary the stroke of the machine, said valve means comprising a bar and a valve closure member on the bar; the body having an orifice with which the valve closure member co-operates; pressure responsive means acting on the bar from opposite sides thereof respectively, the pressure responsive means comprising two pairs of plungers disposed in the body, one of each pair being disposed on one side of the bar and the other of each pair being disposed on the opposite side of the bar; and passages in the body whereby the plungers are arranged to communicate with the ports of the machine and are responsive to the changes in pressure of the respective ports regardless which port has the higher pressure.

2. A means as claimed in claim 1 in which one pair of the plungers is larger than the other pair.

3. A means as claimed in claim 2 in which said two pairs of plungers are spring biased away from the bar and the pair of larger plungers has stronger springs.

References Cited

UNITED STATES PATENTS

| | | | |
|---|---|---|---|
| 2,407,013 | 9/1946 | Ifield | 91—47 |
| 2,544,427 | 3/1951 | Ifield et al. | 91—47 |
| 2,659,425 | 11/1953 | Ifield | 91—47 |
| 2,997,986 | 8/1961 | Claire | 91—47 |
| 2,179,071 | 11/1939 | Wiedmann | 91—204 |
| 3,051,092 | 8/1962 | Lambeck | 91—205 |

PAUL E. MASLOUSKY, *Primary Examiner.*

U.S. Cl. X.R.

91—53, 47, 175, 199